United States Patent
Chung

(10) Patent No.: US 6,807,614 B2
(45) Date of Patent: Oct. 19, 2004

(54) METHOD AND APPARATUS FOR USING SMART MEMORIES IN COMPUTING

(76) Inventor: Shine C. Chung, 5988 Porto Alegre Dr., San Jose, CA (US) 95120

( * ) Notice: Subject to any disclaimer, the term of this patent is extended or adjusted under 35 U.S.C. 154(b) by 185 days.

(21) Appl. No.: 10/099,440

(22) Filed: Mar. 14, 2002

(65) Prior Publication Data

US 2003/0018868 A1 Jan. 23, 2003

Related U.S. Application Data

(60) Provisional application No. 60/306,636, filed on Jul. 19, 2001, and provisional application No. 60/341,411, filed on Dec. 17, 2001.

(51) Int. Cl.[7] .............................................. G06F 12/00
(52) U.S. Cl. ........................ 711/168; 709/107; 709/108
(58) Field of Search ................................. 709/107, 108; 711/168

(56) References Cited

U.S. PATENT DOCUMENTS 4,823,257 A * 4/1989 Tonomura .................. 717/147
5,678,021 A * 10/1997 Pawate et al. .............. 711/104
5,983,004 A * 11/1999 Shaw et al. ................. 709/227
6,292,903 B1 * 9/2001 Coteus et al. ............... 713/401

* cited by examiner

*Primary Examiner*—Donald Sparks
*Assistant Examiner*—Bao Q. Truong
(74) *Attorney, Agent, or Firm*—Beyer Weaver & Thomas, LLP

(57) ABSTRACT

A smart memory computing system that uses smart memory for massive data storage as well as for massive parallel execution is disclosed. The data stored in the smart memory can be accessed just like the conventional main memory, but the smart memory also has many execution units to process data in situ. The smart memory computing system offers improved performance and reduced costs for those programs having massive data-level parallelism. This smart memory computing system is able to take advantage of data-level parallelism to improve execution speed by, for example, use of inventive aspects such as algorithm mapping, compiler techniques, architecture features, and specialized instruction sets.

22 Claims, 21 Drawing Sheets $$\nabla^2 \Phi = \rho/\varepsilon_0$$

$$((\Phi_{i+1,j}+\Phi_{i-1,j}+\Phi_{i,j+1}+\Phi_{i,j-1})-4\Phi_{i,j})/(h^2) = \rho_{i,j}/\varepsilon_0$$

$$\Phi_{i,j} = (\Phi_{i+1,j}+\Phi_{i-1,j}+\Phi_{i,j+1}+\Phi_{i,j-1})/4 - (h^2)\rho_{i,j}/\varepsilon_0 \quad i=1,..,N-1, j=1,..,M-1$$

METHOD AND APPARATUS FOR USING SMART MEMORIES IN COMPUTING

CROSS-REFERENCE TO RELATED APPLICATION

This application claims the benefit of: (i) U.S. Provisional Patent Application No. 60/306,636, filed Jul. 19, 2001 and entitled "Method and Apparatus of Using Smart Memories in Computing System," which is hereby incorporated herein by reference; and (ii) U.S. Provisional Patent Application No. 60/341,411, filed Dec. 17, 2001 and entitled "Method and Apparatus for Using Smart Memory in Computing," which is hereby incorporated herein by reference.

BACKGROUND OF THE INVENTION

1. Field of the Invention

The present invention relates to a computing system and, more particularly, to a computing system that uses computing processors residing in data storage devices to process data in a highly parallel fashion.

2. Description of the Related Art

A computing system generally includes a Central Processing Unit (CPU), a cache, a main memory, a chip set, and a peripheral. The computing system normally receives data input from the peripheral and supplies the data to the CPU where the data is to be processed. The processed data can then be stored back to the peripheral. The CPU can, for example, be an Arithmetic Logic Unit (ALU), a floating-point processor, a Single-Instruction-Multiple-Data execution (SIMD) unit, or a special functional unit. The peripheral can be a memory peripheral, such as a hard disk drive or any nonvolatile massive data storage device to provide mass data storage, or an I/O peripheral device, such as a printer or graphics sub-system, to provide I/O capabilities. The main memory provides less data storage than the hard drive peripheral but at a faster access time. The cache provides even lesser data storage capability than the main memory, but at a much faster access time. The chip set contains supporting chips for said computing system and, in effect, expands the small number of I/O pins with which the CPU can communicate with many peripherals.

FIG. 1 illustrates a conventional system architecture of a general computing system. In FIG. 1, block 10 is a CPU. Block 11 is a cache that has a dedicated high speed bus connecting to CPU for high performance. Block 12 is a chip set to connect CPU with main memory 13 and a fast peripheral 14 such as a graphics subsystem. Block 15 is another chip set to expand the bus, such as RS-232 or parallel port for slower peripherals. Note that the components discussed above are very general building blocks of a computing system. Those skilled in the art understand that a computing system may have different configurations and building blocks beyond these general building blocks.

An execution model indicates how a computing system works. FIG. 2 illustrates an execution model of a typical scalar computing system. Between a CPU 10 and a hard disk 17, there are many different levels of data storage devices such as main memory 13, a cache 11, and register 16. The farther the memory devices are positioned from the CPU 10, the more capacity and the slower speed the memory devices have. The CPU 10 fetches data from the hard disk 17, processes the data to obtain resulting data, and stores the resulting data into the various intermediate data storage devices, such as the main memory 13, the cache 11 or the register 16, depending on how often they will be used and how long they will be used. Each level of storage is a superset of the smaller and faster devices nearer to the CPU 10. The efficiency of this buffering scheme depends on the temporal and spatial localities. The temporal locality means the data accessed now are very likely to be accessed later. The spatial locality means the data accessed now are very likely to be accessed in the same neighborhood later. In today's technology, the CPU 10, the register 16, and two levels of cache 11 are integrated into a monolithic integrated circuit.

FIG. 3 shows an execution model of a vector computer. A vector computer has an array of vector CPUs 210, an array of vector registers 216, a main memory 13, and a hard drive 17. The size of the vector array is usually a power of 2, such as 16 or 32, for example. The vector CPUs 210 fetch the data from the hard drive 17 through the main memory 13 to the vector registers 216 and then process an array of the data at the same time. Hence, the processing speed by the vector computer can be improved by a factor equal to the size of the array. Note that a vector computer can also have a scalar unit, such as the computer system described in FIG. 2, as well as many vector units such as those described in FIG. 3. Some vector computers also make use of caches.

A vector computer is able to exploit data parallelism to speed up those special applications that can be vectorized. However, vector computers replicate many expensive hardware components such as vector CPUs and vector register files to achieve high performance. Moreover, vector computers require very high data bandwidth in order to support the vector CPUs. The end result is a very expensive, bulky and power hungry computing system.

In recent years, logic has been embedded into memories to provide a special purpose computing system to perform specific processing. Memories that include processing capabilities are sometimes referred to as "smart memory" or intelligent RAM. Research on embedding logic into memories has led to some technical publications, namely: (1) Duncan G, Elliott, "Computational RAM: A Memory-SIMD Hybrid and its Application to DSP," Custom Integrated Circuit Conference, Session 30.6, 1992, which describes simply a memory chip integrating bit-serial processors without any system architecture considerations; (2) Andreas Schilling et al., "Texram: A Smart Memory for Texturing," Proceedings of the Sixth International Symposium on High Performance Computer Architecture, IEEE, 1996, which describes a special purpose smart memory for texture mapping used in a graphics subsystem; (3) Stylianos Perissakis et al., "Scalable Processors to 1 Billion Transistors and Beyond: IRAM," IEEE Computer, September 1997, pp. 75–78, which is simply a highly integrated version of a vector computer without any enhancement in architecture level; (4) Mark Horowitz et al., "Smart Memories: A Modular Configurable Architecture," International Symposium of Computer Architecture, June 2000, which describes a project to try to integrate general purpose multi-processors and multi-threads on the same integrated circuit chip; and (5) Lewis Tucker, "Architecture and Applications of the Connection Machines," IEEE Computer, 1988, pp. 26–28, which used massively distributed array processors connected by many processors, memories, and routers among them. The granularity of the memory size, the bit-serial processors, and the I/O capability is so fine that these processors end up spending more time to communicate than to process data.

Accordingly, there is a need for computing systems with improved efficiency and reduced costs as compared to conventional vector computers.

SUMMARY OF THE INVENTION

The invention pertains to a smart memory computing system that uses smart memory for massive data storage as well as for massive parallel execution. The data stored in the smart memory can be accessed just like the conventional main memory, but the smart memory also has many execution units to process data in situ. The smart memory computing system offers improved performance and reduced costs for those programs having massive data-level parallelism. This invention is able to take advantage of data-level parallelism to improve execution speed by, for example, use of inventive aspects such as algorithm mapping, compiler techniques, architecture features, and specialized instruction sets.

The invention can be implemented in numerous ways including, a method, system, device, and computer readable medium. Several embodiments of the invention are discussed below.

As a smart memory computing system to process data in parallel, one embodiment of the invention includes at least: a central processing unit; a main memory unit that provides data storage for the central processing unit; a smart memory unit to not only store data for the central processing unit but also to process data therein; and a massive data storage that provides storage for a superset of data stored in the main memory system and in the smart memory system.

As a smart memory computing system to process data in parallel, another embodiment of the invention includes at least: a central processing unit; a main memory unit that provides data storage for the central processing unit; a smart memory unit to not only store data for the central processing unit but also to process data therein; a massive data storage that provides storage for a superset of data stored in the main memory system and in the smart memory system; and means for the central processing unit to interact with the smart memory system.

Other aspects and advantages of the invention will become apparent from the following detailed description taken in conjunction with the accompanying drawings which illustrate, by way of example, the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention pertains to a smart memory computing system that uses smart memory for massive data storage as well as for massive parallel execution. The data stored in the smart memory can be accessed just like the conventional main memory, but the smart memory also has many execution units to process data in situ. The smart memory computing system offers improved performance and reduced costs for those programs having massive data-level parallelism. This invention is able to take advantage of data-level parallelism to improve execution speed by, for example, use of inventive aspects such as algorithm mapping, compiler techniques, architecture features, and specialized instruction sets.

Figure 1:
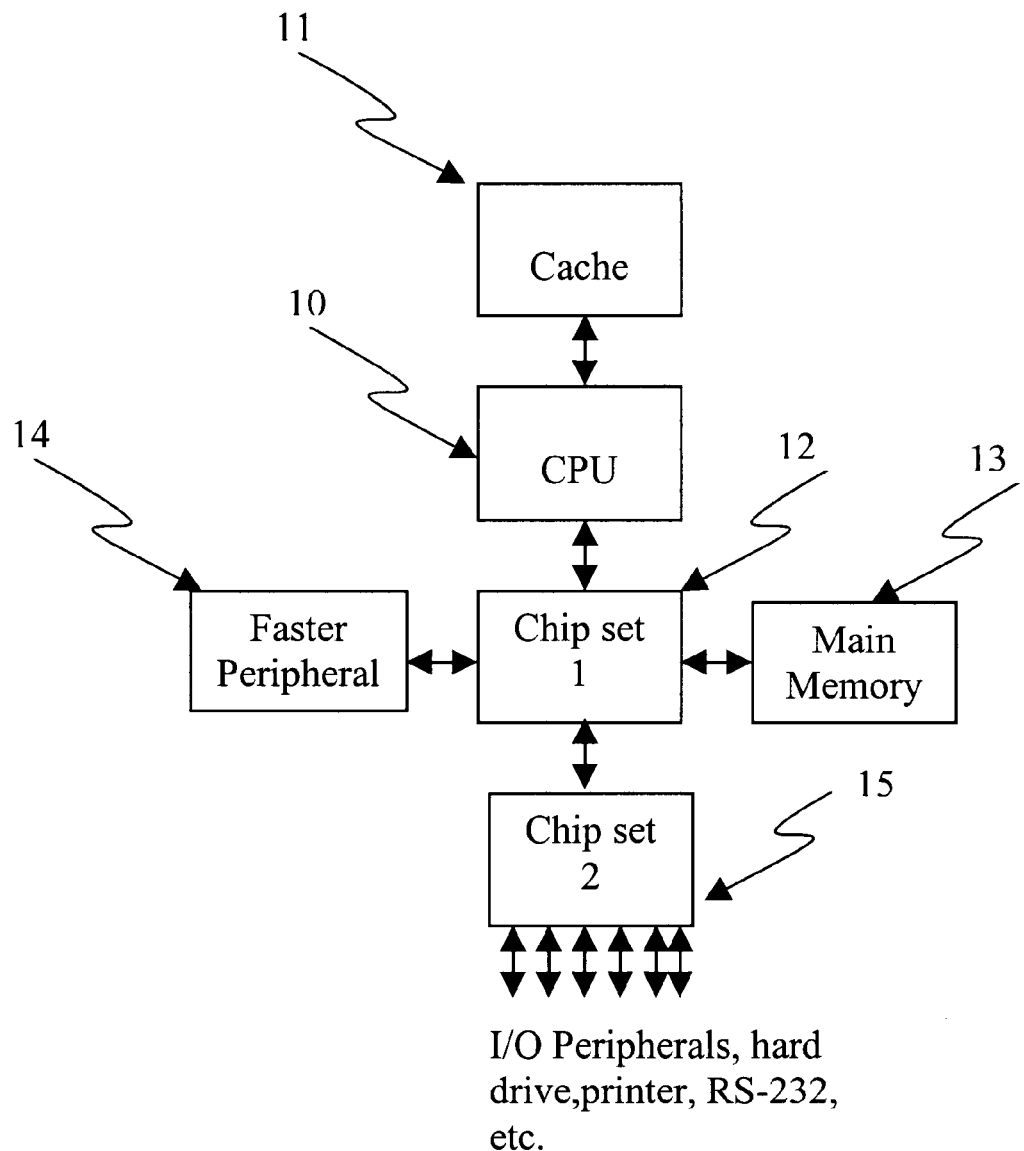
FIG. 1 shows the system architecture of a prior art computing system.
Figure 2:
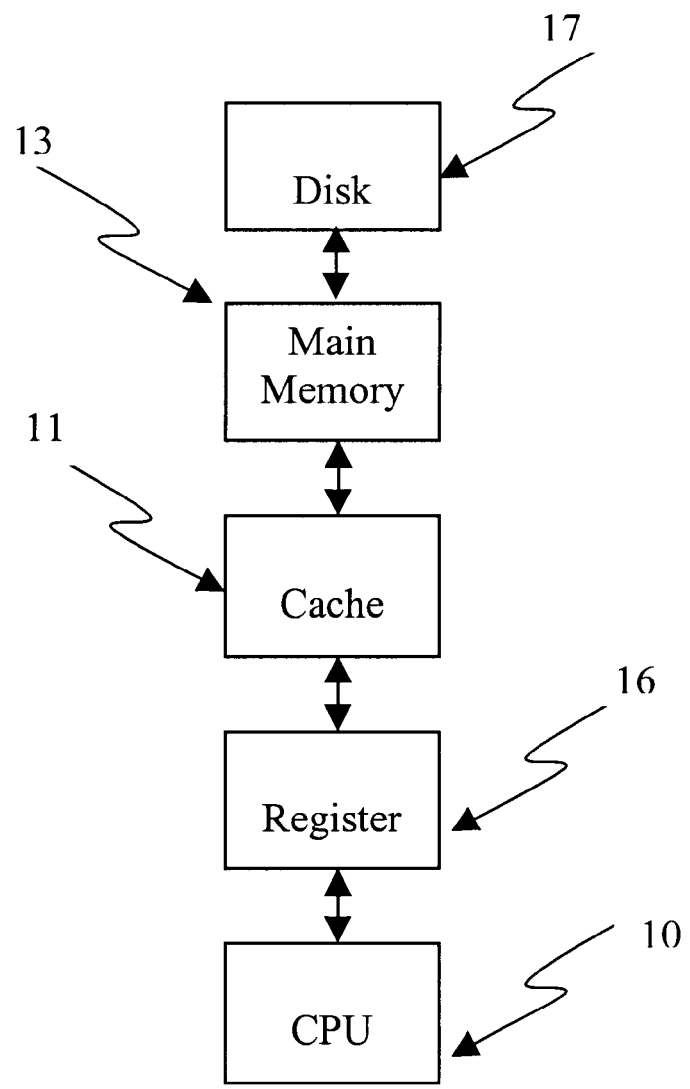
FIG. 2 shows the execution model of a scalar computing system.
Figure 3:
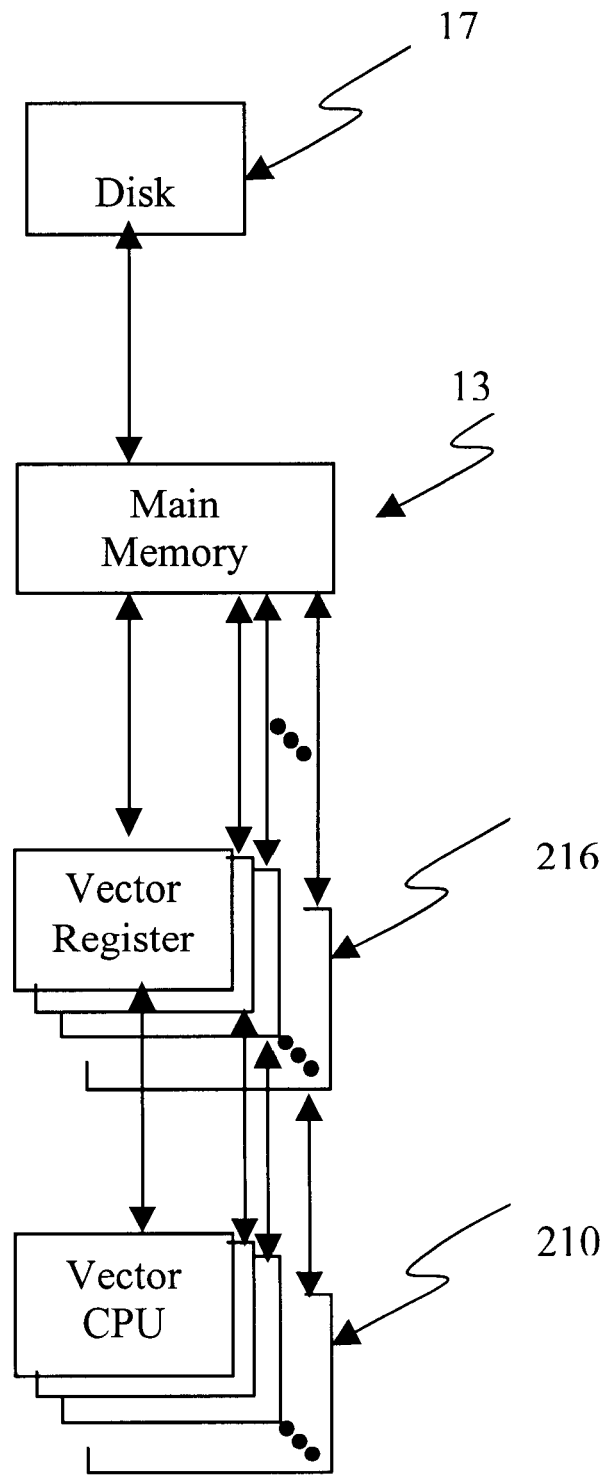
FIG. 3 shows the execution model of a vector computing system.
Figure 4:
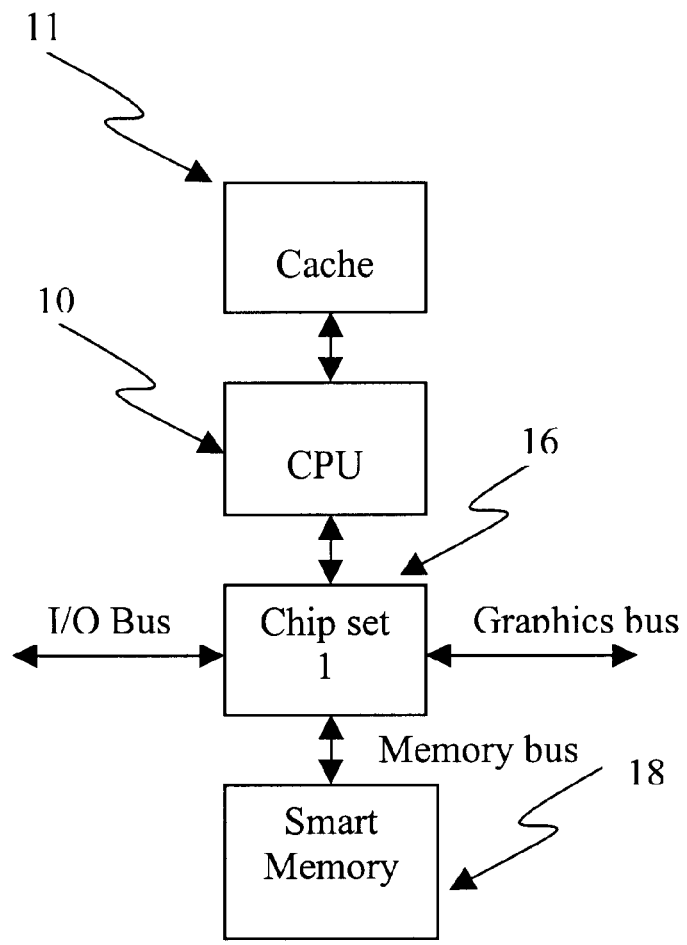
FIG. 4 shows the system architecture of a smart memory computing system.

FIG. 4 illustrates basic system architecture for a smart memory computer system according to one embodiment of the invention. A CPU 10 executes instructions to process data and control operation of the smart memory computer system. The data being processed can be stored in a cache memory 11 or a smart memory 18. The smart memory 18 provides not only data storage but also processing units to process data. The CPU 10 can access data from the smart memory 18 through a bus extender 16. In one embodiment, the bus extender 16 can extend a system bus from the CPU 10 into an Input/Output (I/O) bus and a bus for the smart memory 18.

FIGS. 4(a)–4(e) illustrates other embodiments for the system architecture of the smart memory computer system shown in FIG. 4.

Figure 4A:
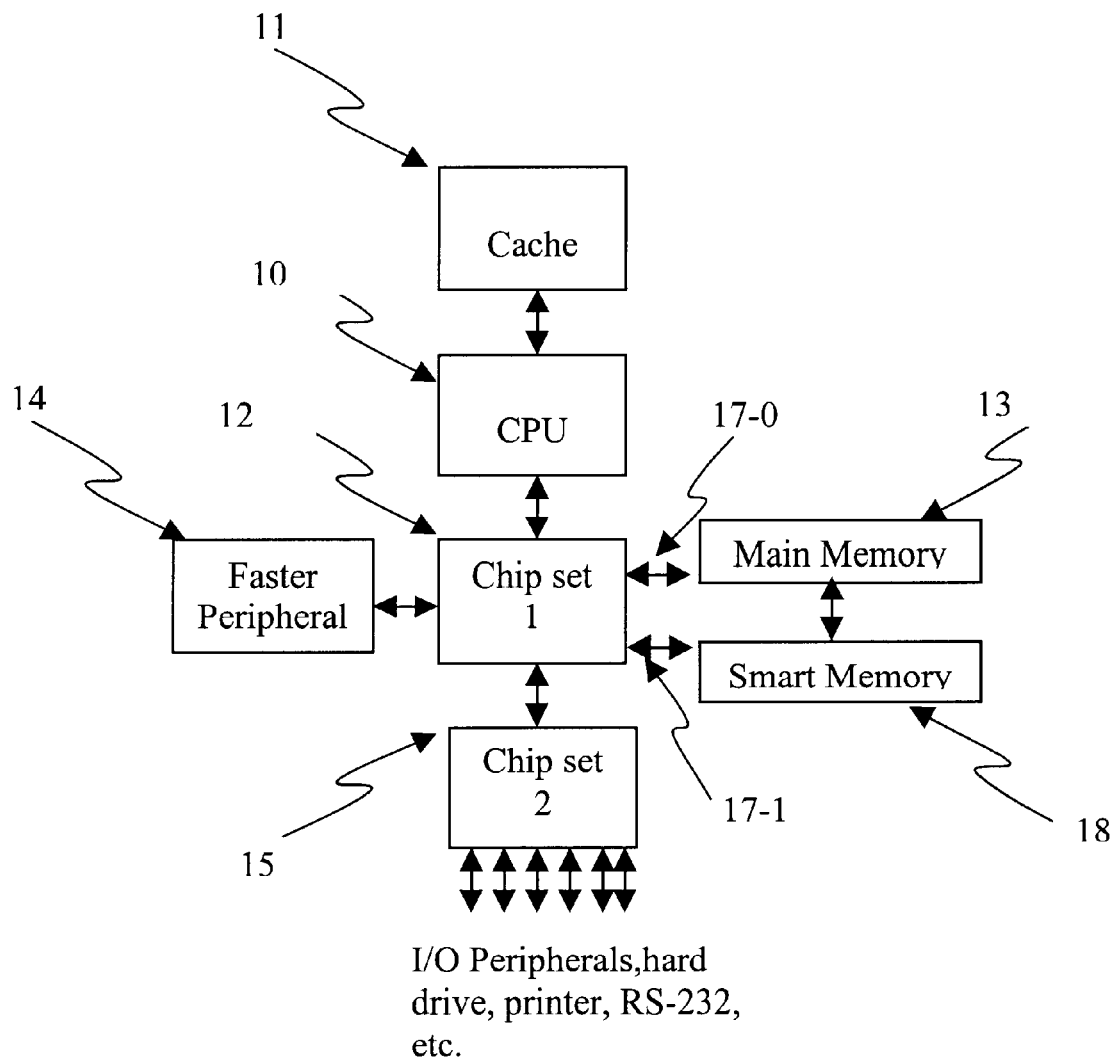
FIG. 4(a) shows one embodiment of the smart memory system implementation.
Figure 4B:
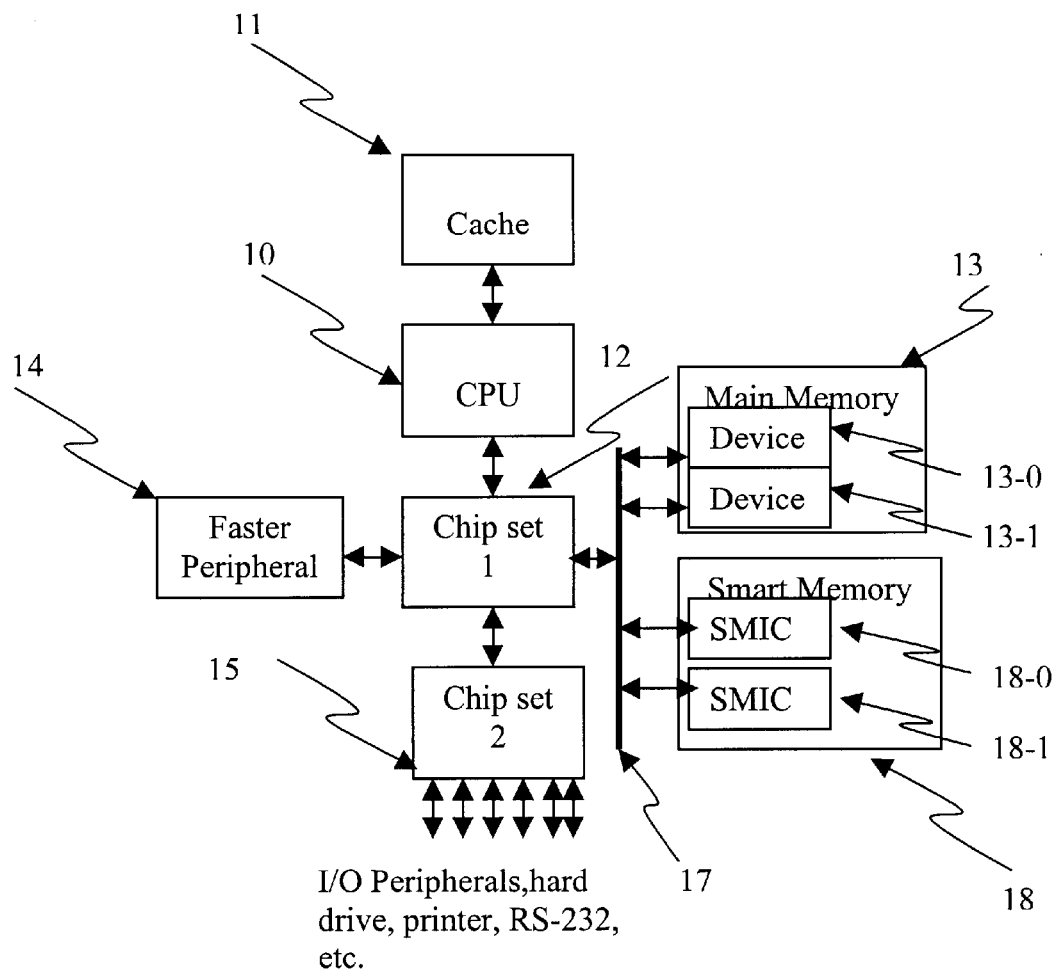
FIG. 4(b) shows another embodiment of the smart memory system implementation.
Figure 4C:
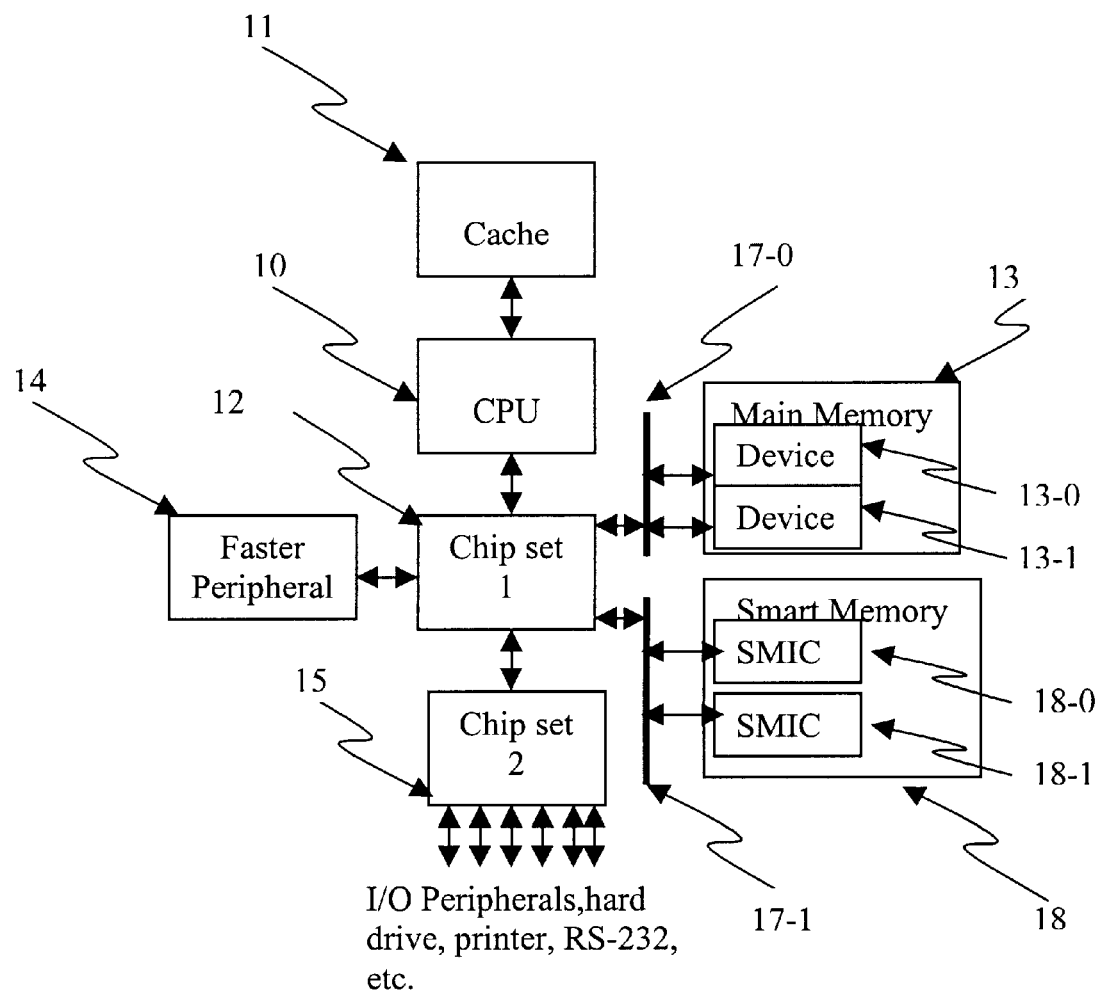
FIG. 4(c) shows still another embodiment of the smart memory system implementation.
Figure 4D:
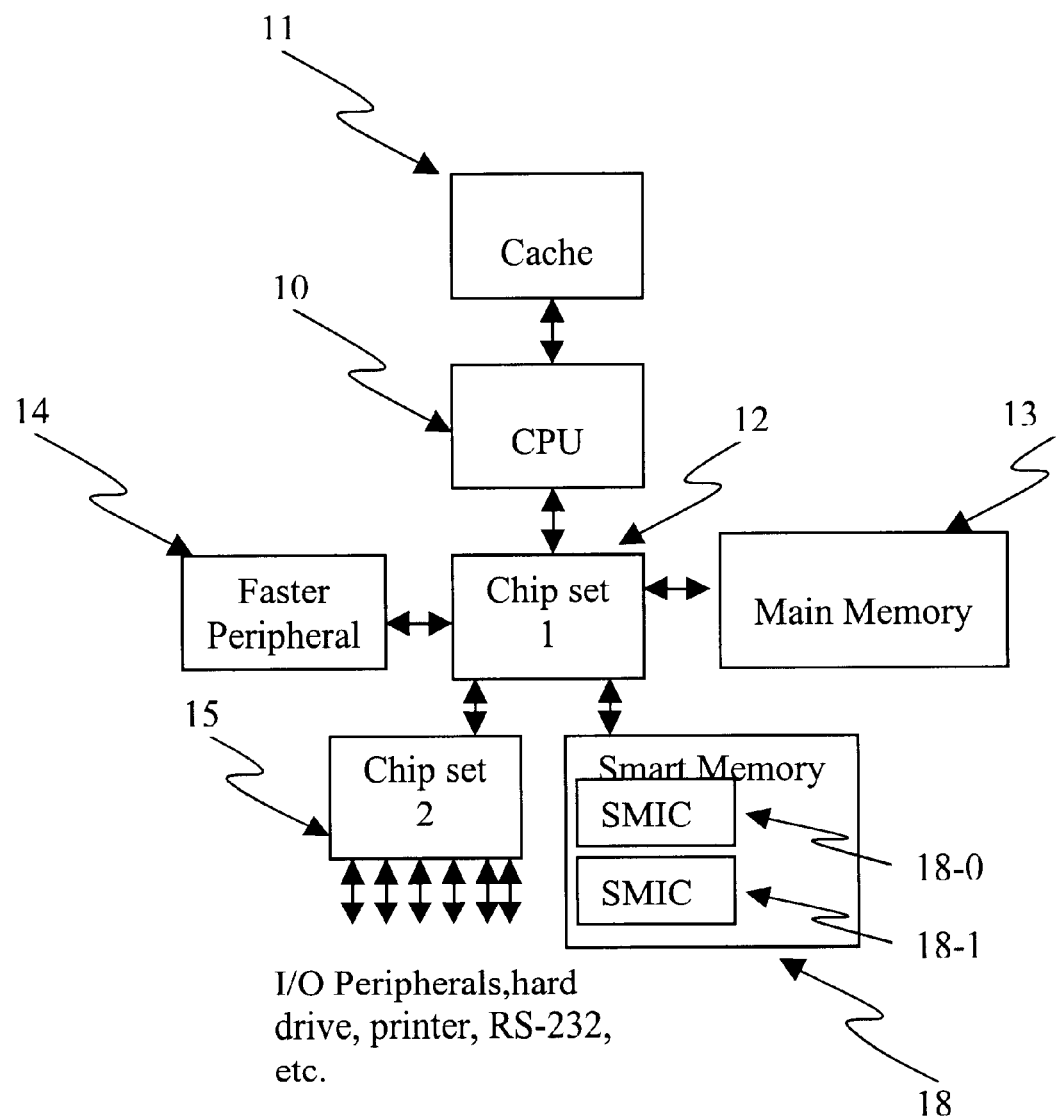
FIG. 4(d) shows yet still another embodiment of the smart memory system implementation.
Figure 4E:
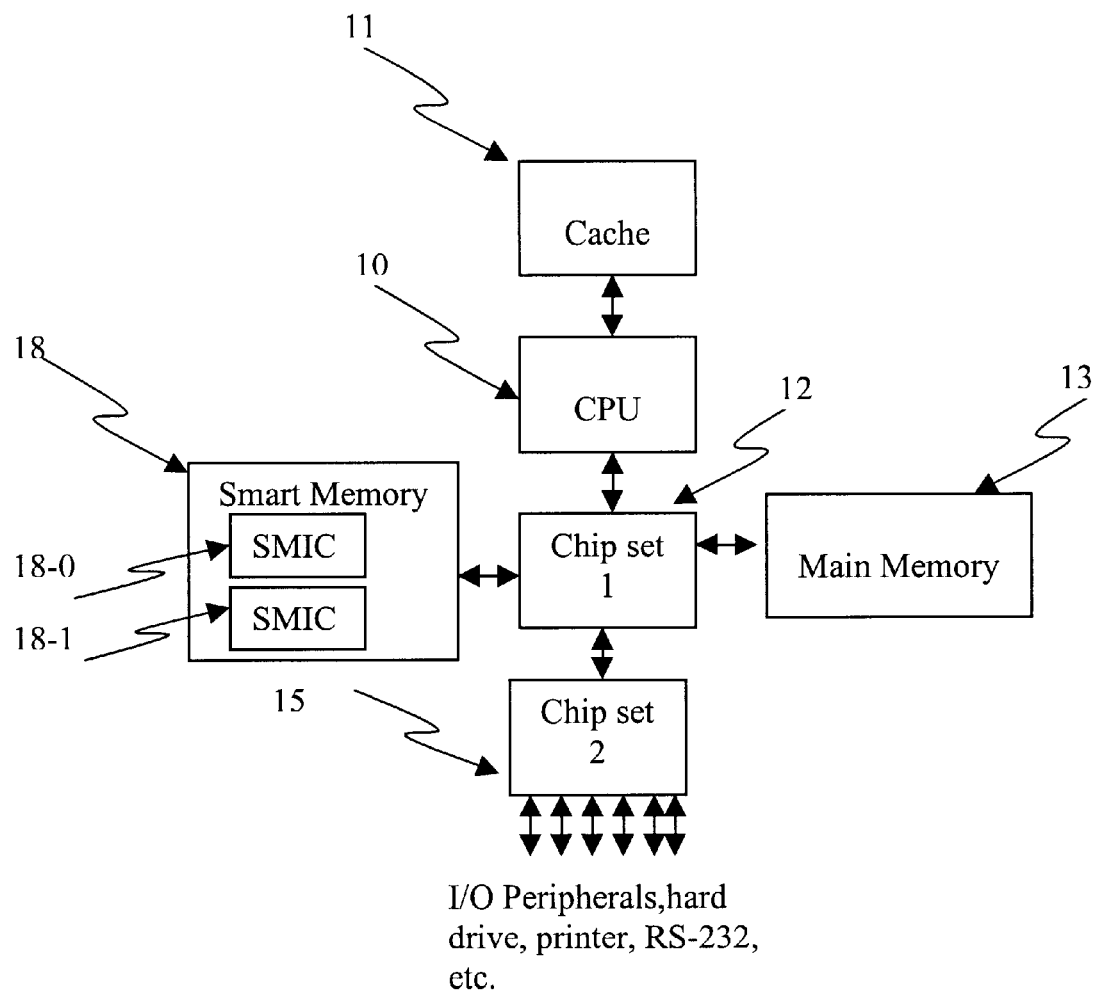
FIG. 4(e) shows yet still another embodiment of the smart memory system implemented as a graphics co-processor.

FIG. 4(a) illustrates system architecture of a smart memory computer system according to another embodiment of the invention. The CPU 10 executes instructions to process data and control operation of the smart memory computer system. The data being processed can be stored in the cache memory 11, a main memory 13 or the smart memory 18. The smart memory 18 provides not only data storage but also processing units to process data. The CPU 10 can access data through a first chip set 12. The first chip set 12 couples to the CPU 10, a fast peripheral 14, a second chip set 15 and a memory bus 17-0 and 17-1. As an example, the fast peripheral 14 can be a graphics subsystem. The second chip set 15 provides further bus expansion for other peripheral devices (e.g., slow peripherals), such as hard drives, printer, serial port, etc. The memory bus 17-0 provides access to the main memory 13 and the memory bus 17-1 to the smart memory 18. The smart memory 18 can also directly communicate with the main memory 13. Hence, in this embodiment, both the main memory 13 and the smart memory 18 are dual-port memories, which are more costly to implement than single port memories.

FIG. 4(*b*) illustrates system architecture of a smart memory computer system according to still another embodiment of the invention. The embodiment shown in FIG. 4(*b*) is similar to the embodiment shown in FIG. (a). In this embodiment, the main memory 13 includes a plurality of main memory devices 13-0 and 13-1. Normally, the main memory devices 13-0 and 13-1 are implemented by DRAM devices. In this embodiment, the smart memory 18 includes a plurality of Smart Memory Integrated Circuits (SMICs) 18-0 and 18-1. In this embodiment, the memory bus 17 is shared by the main memory 13 and the smart memory 18. The first chip set 12 can communicate with either the main memory devices 13-0 and 13-1 or the SMICs 18-0 and 18-1 by accessing different memory space. Similarly, the smart memory 18 can request the memory bus 17 to communicate with the different SMICs 18-0 and 18-1 or main memory devices. The smart memory 18 can communicate with the main memory 13, interrupt the CPU 10, or accept an interrupt by the CPU 10 through the first chipset 12. In this embodiment, the smart memory 18 can act as a bus master or a bus slave, whereas the main memory 13 can only act as a bus slave. In this configuration, if the smart memory 18 acquires the ownership of memory bus 17, the CPU 10 is not able to access the main memory 13 through the first chipset 12 until the smart memory 18 releases the memory bus 17. Often, it will be preferable to "ride" the smart memory on the memory bus as shown in FIG. 4(*b*).

FIG. 4(*c*) illustrates system architecture of a smart memory computer system according to still another embodiment of the invention. The embodiment shown in FIG. 4(*c*) is similar to the embodiment shown in FIG. 4(*b*). In this embodiment, the memory bus 17 is implemented as two separate memory buses, namely, a first memory bus 17-0 and a second memory bus 17-1. The first memory bus 17-0 couples the main memory 13 to the first chip set 12. The second memory bus 17-1 couples the smart memory 18 to the first chip set 12. In this configuration, even if the smart memory 18 has acquired the ownership of the second memory bus 17-1 (such as to move data between the SMIC0 18-0 and the SMIC1 18-1), the CPU 10 is still able to access the main memory 13 through the first chipset 12 using the first memory bus 17-0.

FIG. 4(*d*) illustrates system architecture of a smart memory computer system according to yet still another embodiment of the invention. The embodiment shown in FIG. 4(*d*) is somewhat similar to the embodiment shown in FIG. 4(*c*). In this embodiment, the smart memory 18 is connected to the first chip set 12. Here, the smart memory 18 is connected to the first chip set 12 along an I/O bus, and the second chip set 15 can be connected to the first chip set 12 using the same or different I/O bus. The advantage of connecting the smart memory 18 to the I/O bus is that the first chip set 12 inherently provides a built-in bus master and interrupt capability. However, the disadvantage of connecting the smart memory 18 to the I/O bus is that the bus bandwidth is substantially less than that offered by a memory bus.

FIG. 4(*e*) illustrates system architecture of a smart memory computer system according to yet still another embodiment of the invention. The embodiment shown in FIG. 4(*e*) is somewhat similar to the embodiment shown in FIG. 4(*d*). In this embodiment, the smart memory 18 is connected to the first chip set 12 in the bus that is usually connected to a graphics subsystem. Hence, the smart memory can act as massive parallel co-processors to process graphics data, one SMIC working on a sub-space of the overall graphics data space.

An example of usage of a smart memory computing system is as follows. When a compiler detects massive data parallelism in a program, the compiler maps the data into smart memory arrays so that the arrays of the data to be processed are physically located in the smart memory (e.g., SMICs). The compiler also generates the operating code (OPCODE) to be loaded into an instruction section of the smart memory. When the host CPU is about to execute the instructions in the smart memory, the CPU issues a start signal to the smart memory to trigger the instruction execution for one or all the smart memories in the subsystem. Then, the CPU can continue to do other tasks when the smart memory is executing instructions by itself. In other words, in one embodiment, the smart memory can be considered as massive co-processors residing in the memory or I/O subsystem. The start signal can be either a dedicated signal to the smart memory system or a specific memory address with specific data to write.

When the smart memory is busy executing the instructions, not all the smart memories will finish their jobs at the same time because the floating-point operations inside the smart memory may have exceptions. When exceptions occur, there are interrupt vectors in the instruction section of the smart memories to process the exceptions. To process exceptions within the smart memories is more efficient than asking the host CPU to do the job. When a smart memory device processes an exception, this device can send a stall signal to other devices in smart memory system for synchronization. After all smart memories finish their jobs, the whole smart memory subsystem completes its task. Then, a status bit will be generated for the CPU to poll, or the smart memory system generates an interrupt to inform the CPU that the smart memory is not busy.

During the smart memory execution, one of the smart memory devices (e.g., SMIC) may request the memory bus to communicate data with the other smart memory devices or main memory. In additional, the smart memory has the capability to accept interrupt from CPU when the smart memory execution goes into an infinite loop. These features are quite different from the conventional memory that only acts as bus slave or "dumb memory."

Figure 5:
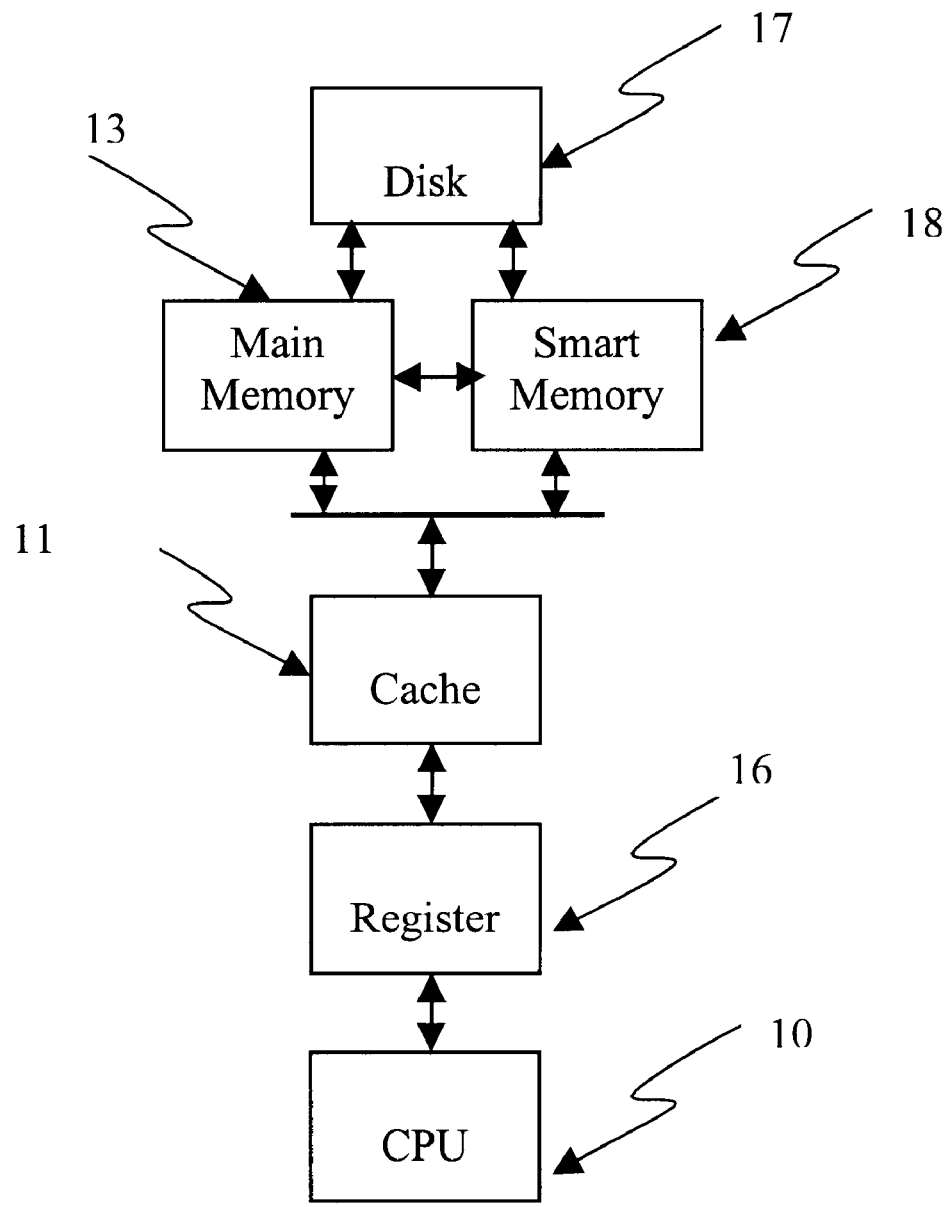
FIG. 5 shows the execution model of a smart memory system.

FIG. 5 shows the execution model of a smart memory computer system. The disk 17 can be connected to either the main memory 13 or the smart memory 18. Either the main memory or the smart memory can be accessed by the CPU 10 using conventional memory access instructions. Temporary data storage is provided by the cache 11 and the register 16.

Before a more detailed description of the smart memory structure is depicted, it is worthwhile to describe how an application program can benefit from this smart memory computer system and how the smart memory resides in the overall memory map.

Figure 6:
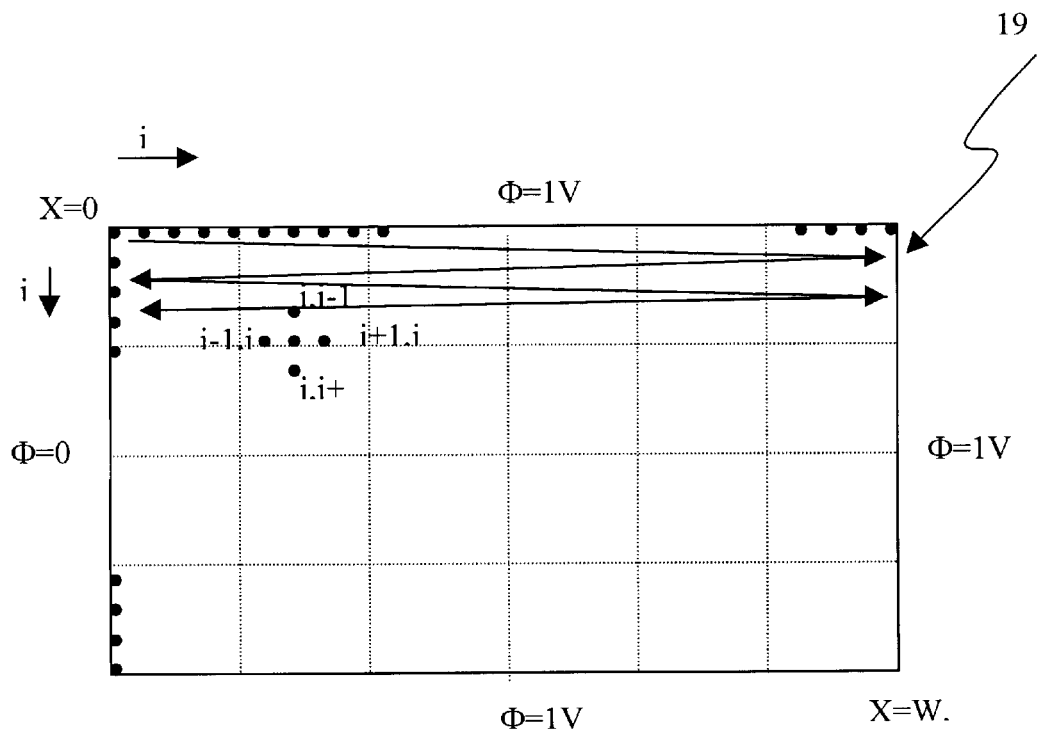
FIG. 6 shows the diagram of a 2D Poisson's equation solver using the conventional algorithm.

FIG. 6 shows a two-dimensional Poisson's equation solver that has massive data-level parallelism to be exploited by a smart memory computer system. The data space of interest 19 is bounded in a rectangle measured by X=0 to X=W and Y=0 to Y=L. Using a digital computer to solve these kinds of problems can be achieved by approximating the continuum by discrete data points and approximate differentiation by finite difference between those data points, for example. Each data point inside this rectangle is indexed by (i, j), where i=0 to N−1, and j=0 to M−1, for example. Note that the number of data points, the size, the coordinate, and the shape of the data space are for illustration purpose. The scope of this invention is very general and is not limited by particular parameters or numerical algorithms as should be recognized by those skilled in the arts. The finite difference method to solve the Poisson's equation $\nabla^2 \Phi = \rho/\epsilon_0$ is to convert the partial differential equation into simultaneous finite difference equations as follows:

$$((\Phi_{i+1,j}+\Phi_{i-1,j}+\Phi_{i,j+1}+\Phi_{i,j-1})-4\Phi_{i,j})/(h^2)=\rho_{i,j}/\epsilon_0 \; i=1, \ldots, N-2, \; j=1, \ldots, M-2$$

or $$\Phi_{i,j}=(\Phi_{i+1,j}+\Phi_{i-1,j}+\Phi_{i,j+1}+\Phi_{i,j-1})/4-(h^2/4)\,\rho_{i,j}/\epsilon_0 \; i=1, \ldots, N-2, \; j=1, \ldots, M-2 \quad \text{Eq. (1.1)}$$

where h=W/N=L/M.

Once the boundary conditions of this problem are known, the $\Phi_{i,j}$'s can be solved by iterations. For example, if the boundary conditions of $\Phi$ is $\Phi=0$ when X=0 or Y=0, and $\Phi=1$ when X=W or Y=L, then the $\Phi_{i,j}$'s can be solved for i=1 to N−2 and j=1 to M−2 by applying Eq. (1.1) to all the data points with an initial guess. This process can be iterated many times until the difference between two successive $\Phi_{i,j}$'s are smaller than the required tolerance. This algorithm can be described in details as follows:

Step 1: Apply initial guesses to $\Phi_{i,j}$ for all data points i=1 to N−2 and j=1 to M−2.

Step 2: Calculate the new value $\Phi'_{i,j}$ by using the Eq.(1.1) for all points.

Step 3: Find the maximum tolerance max $|\Phi'_{i,j}-\Phi_{ij}|$ for all points.

Step 4: If the max $|\Phi'_{i,j}-\Phi_{ij}|<\epsilon$, where $\epsilon$ is the tolerance, then stop.

Otherwise, repeat step 2 through 4 until the tolerance can be met.

Figure 6A:
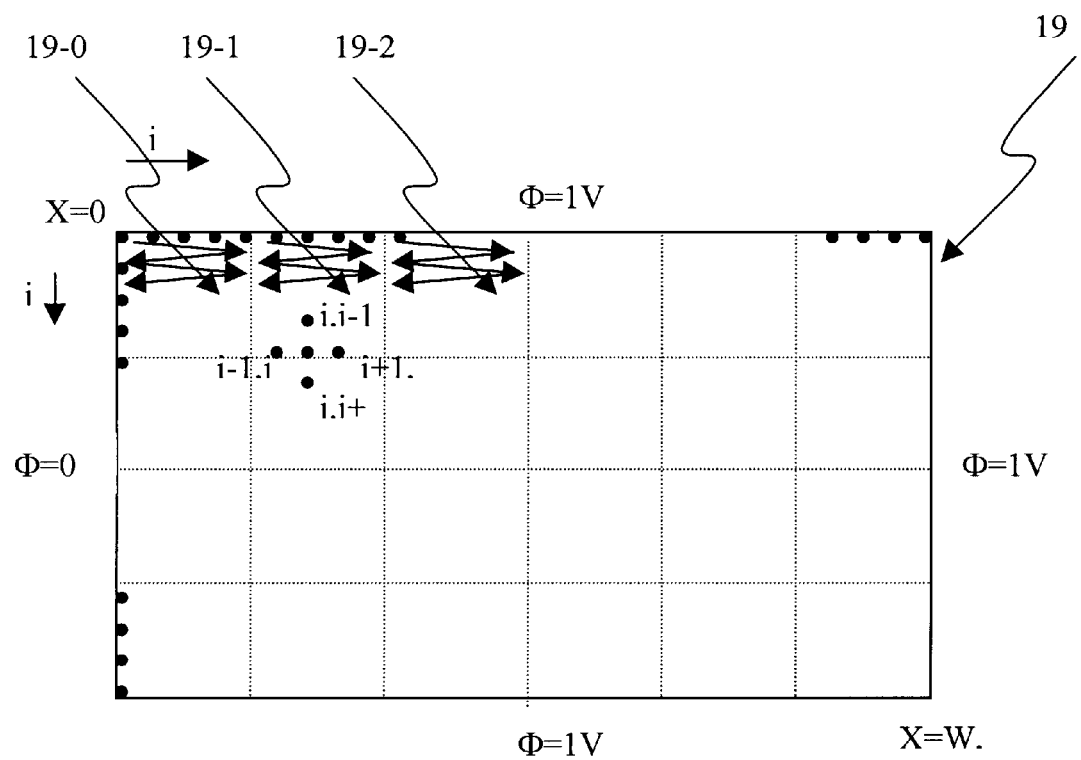
FIG. 6(a) shows one algorithm embodiment for solving the 2D Poisson's equation using smart memory computer.

FIG. 6(a) shows one embodiment of algorithms using the smart memory computer system. The data space 19 in FIG. 6 can be divided into many sections 19-0, 19-1, 19-2, etc. Each data section 19-0, 19-1, etc. is mapped into a SMIC (e.g., SMICs 18-0 and 18-1 in FIG. 4(a) and 4(b)), respectively, such that calculating $\Phi_{i,j}$'s can be done in parallel in each section. After the initial guesses are setup, the iterations are processed section by section in the smart memory system until convergence. This section-by-section approach not only saves from having to perform expensive data movement, but can also provide more locality for the smart memory to process data in mass. Assuming that there are only three SMICs, this algorithm can be described in details as follows:

Step 1: Apply initial guesses to $\Phi_{i,j}$ for all data points i=1 to N−2 and j=1 to M−2.

Step 2: Map sections 19-0, 19-1 and 19-2 into the available SMICs 18-0, 18-1 and 18-2.

Step 3: Calculate the new values $\Phi'_{i,j}$'s by using the Eq.(1.1) and find the maximum tolerance.

Step 4: Map sections 19-3, 19-4 and 19-5 into SMICs 18-0, 18-1 and 18-2 and repeat the step 3 until all sections 19 are mapped into SMICs 18 and are calculated.

Step 5: If the max $|\Phi'_{i,j}-\Phi_{i,j}|<\epsilon$ for all the sections, then stop. Otherwise, repeat step 2 through 5 until the iteration convergence and the tolerance can be met.

In another embodiment the values in each section can be calculated until convergence before loading the next three sections. This algorithm is described in more details as follows:

Step 1: Apply initial guesses to $\Phi_{i,j}$ for all data points i=1 to N−2 and j=1 to M−2.

Step 2: Map sections 19-0, 19-1 and 19-2 into the available SMICs 18-0, 18-1 and 18-2.

Step 3: Calculate the new values $\Phi'_{i,j}$'s by using the Eq.(1.1) and find the maximum tolerance until max $|\Phi'_{i,j}-\Phi_{i,j}|<\epsilon$ for all the sections.

Step 4: Map sections 19-3, 19-4 and 19-5 into SMICs 18-0, 18-1 and 18-2 and repeat the step 3 until all sections 19 are mapped into SMICs 18 and are calculated.

If the time spent in loading data into the SMICs is comparable with the actual execution, this algorithm can perform better than the previously described algorithm though the data between the section borders need to be updated constantly in each iteration.

Figure 6B:
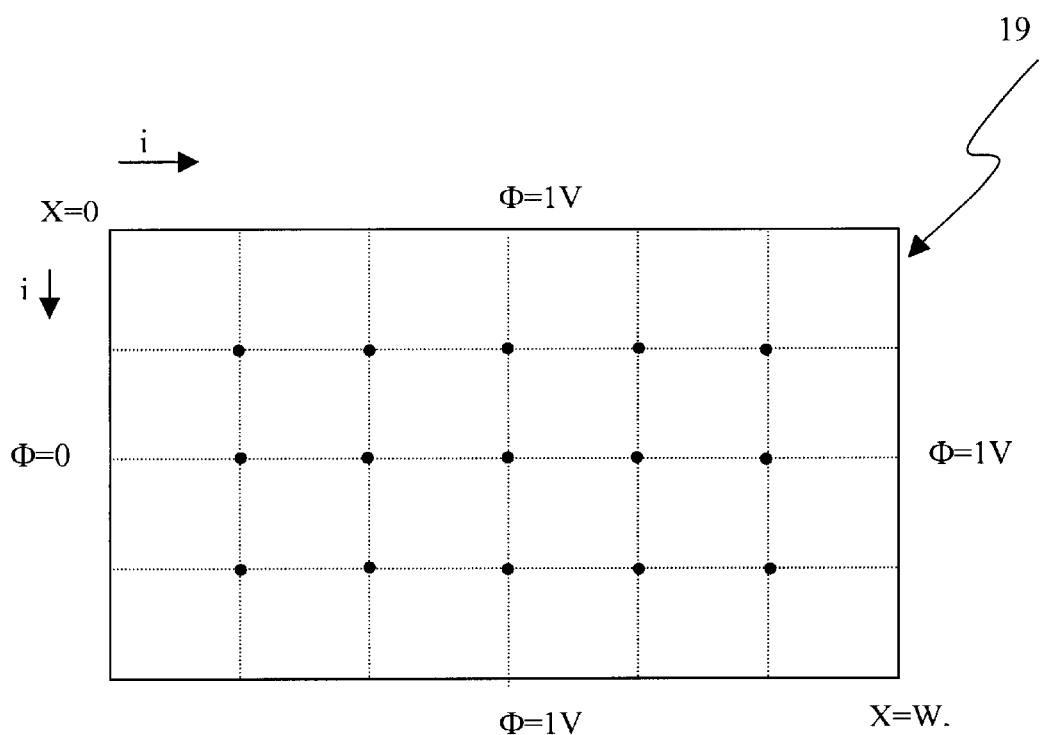
FIGS. 6(b) and 6(c) show a preferred algorithm embodiment for solving the 2D Poisson's equation using smart memory computer.
Figure 6C:
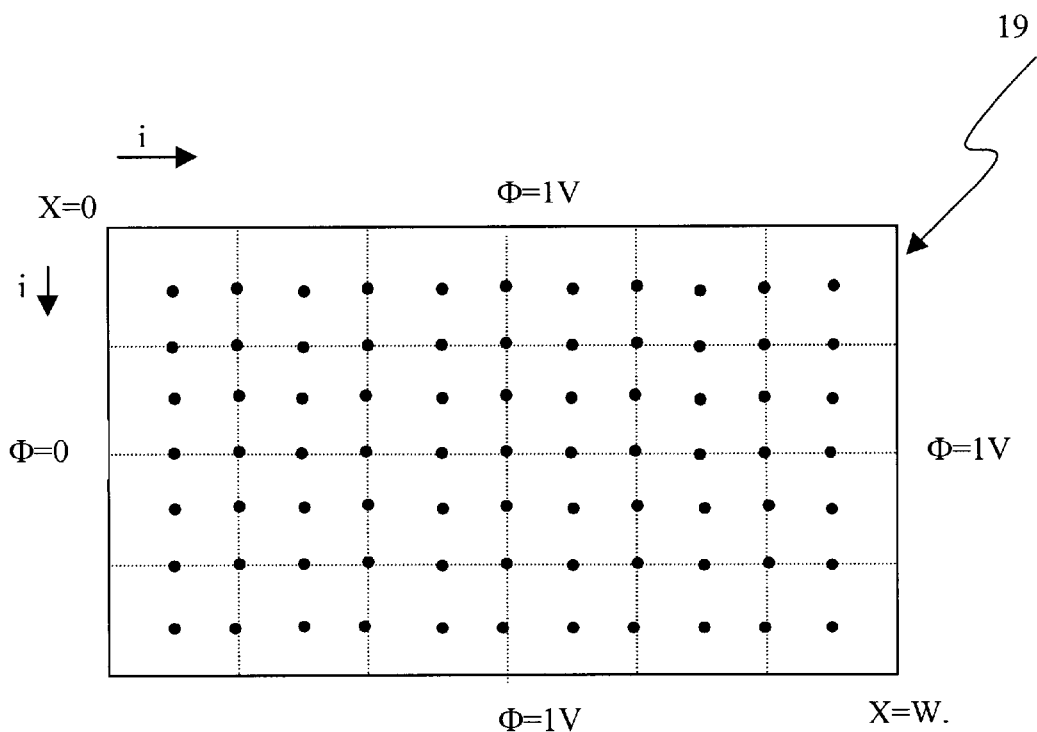

FIGS. 6(b) and 6(c) shows a preferred embodiment of the previous algorithms by the smart memory computer system. Since solving the partial differential equations depends heavily on the boundary conditions; hence, the performance can be improved if the boundary conditions can be easily passed to internal data points. The algorithms shown in FIGS. 6(b) and 6(c) are adaptive.

Assuming that there are only 3 SMICs and each SMIC has 5 processing units, the whole data space is divided into coarse grids with only 15 data points, as shown in FIG. 6(b), that can be mapped into the smart memory 18. The iterations for all the data points are then performed until convergence. The grids can be made finer and the new data points can be initialized by interpolation before the new iterations begin. For example, the data space is divided into 60 data points that can be mapped into the smart memory 4 times as shown in FIG. 6(c). The calculation for the new values at each of the data points are iterated until the desired tolerance can be met. Then, the grids are made even finer until the desired grid resolution meets the requirement. Such as algorithm can be described in more details as follows:

Step 1: Divide the whole data space into coarse grids such that all the data points can be mapped into the entire smart memory once. Make initial guesses for all the data points.

Step 2: Calculate the new values $\Phi'_{i,j}$'s by using the Eq.(1.1) and find the maximum tolerance max $|\Phi'_{i,j}-\Phi_{i,j}|$ in each SMIC.

Step 3: Repeat step 2 until max $|\Phi'_{i,j}-\Phi_{i,j}|<\epsilon$ for all the data points.

Step 4: Divide the grids 4 times finer such that all the data points can be mapped into the entire smart memory 4 times. Setup the initial guesses for the new data points by interpolation. Calculate the new values $\Phi'_{i,j}$'s by using the Eq.(1.1) and the maximum tolerance max $|\Phi'_{i,j}-\Phi_{i,j}|$ in each SMIC.

Step 5: Repeat step 4 until the max $|\Phi'_{i,j}-\Phi_{i,j}|<\epsilon$ for all the data points.

Step 6: Repeat steps 4 to 5 until the resolution of the grid size meets the requirement.

Figure 7:
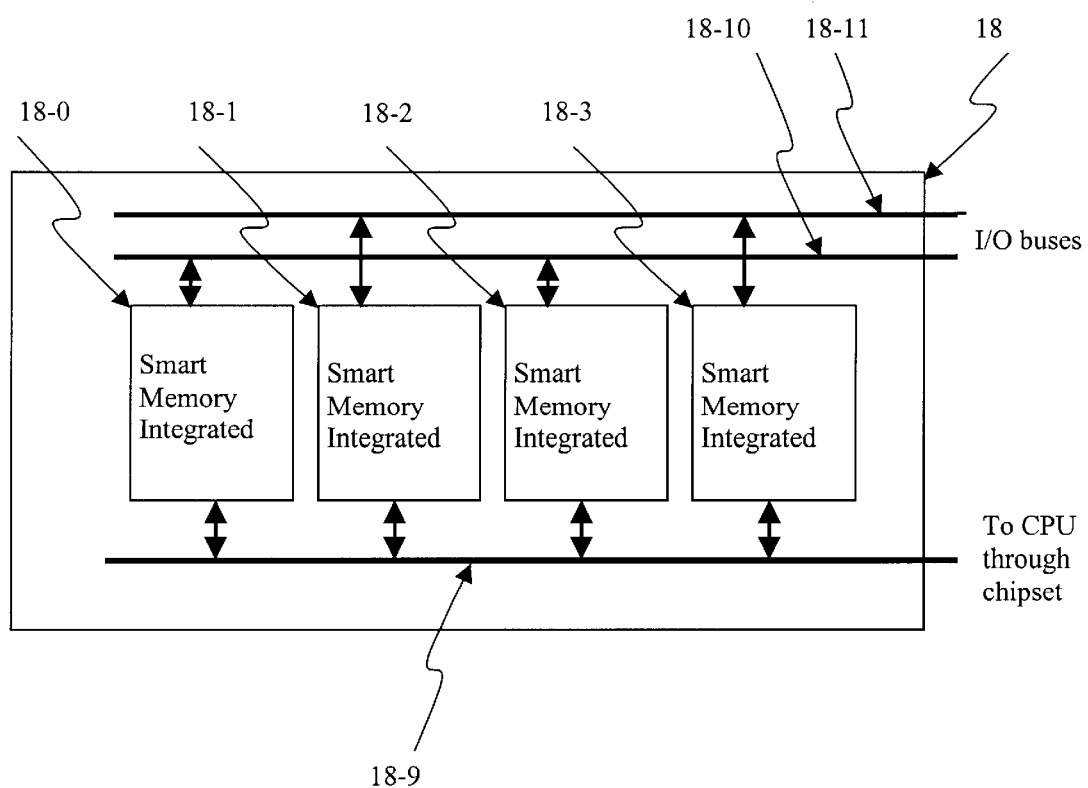
FIG. 7 shows a smart memory system that consists of many smart memory integrated circuits.

FIG. 7 shows a smart memory 18 according to one embodiment of the invention. The smart memory 18 consists of many smart memory integrated circuits (SMICs) 18-0, 18-1, 18-2, and 18-3 connected by a common bus to CPU through a chip set (e.g., the first chip set 12). Each SMIC can be, but need not be, the same chip. Each SMIC can process same or different programs in general. In solving Poisson's equation, each section 19-0 through 19-3 in FIG. 6(a) can be mapped into each smart memory integrated circuits (SMIC) 18-0 through 18-3. Each SMIC can not only process data within itself but also can communicate with the other SMICs. Although the SMICs can have separate local buses connected to each other, it is more cost effective to have one common bus as shown in FIG. 7. Each SMIC may have its own I/O ports to connect to other I/O devices, or buses. The buses 18-10 and 18-11 in FIG. 7 illustrate the SMIC's I/O ports are connected to as a mean to communicate with the external devices.

Figure 8:
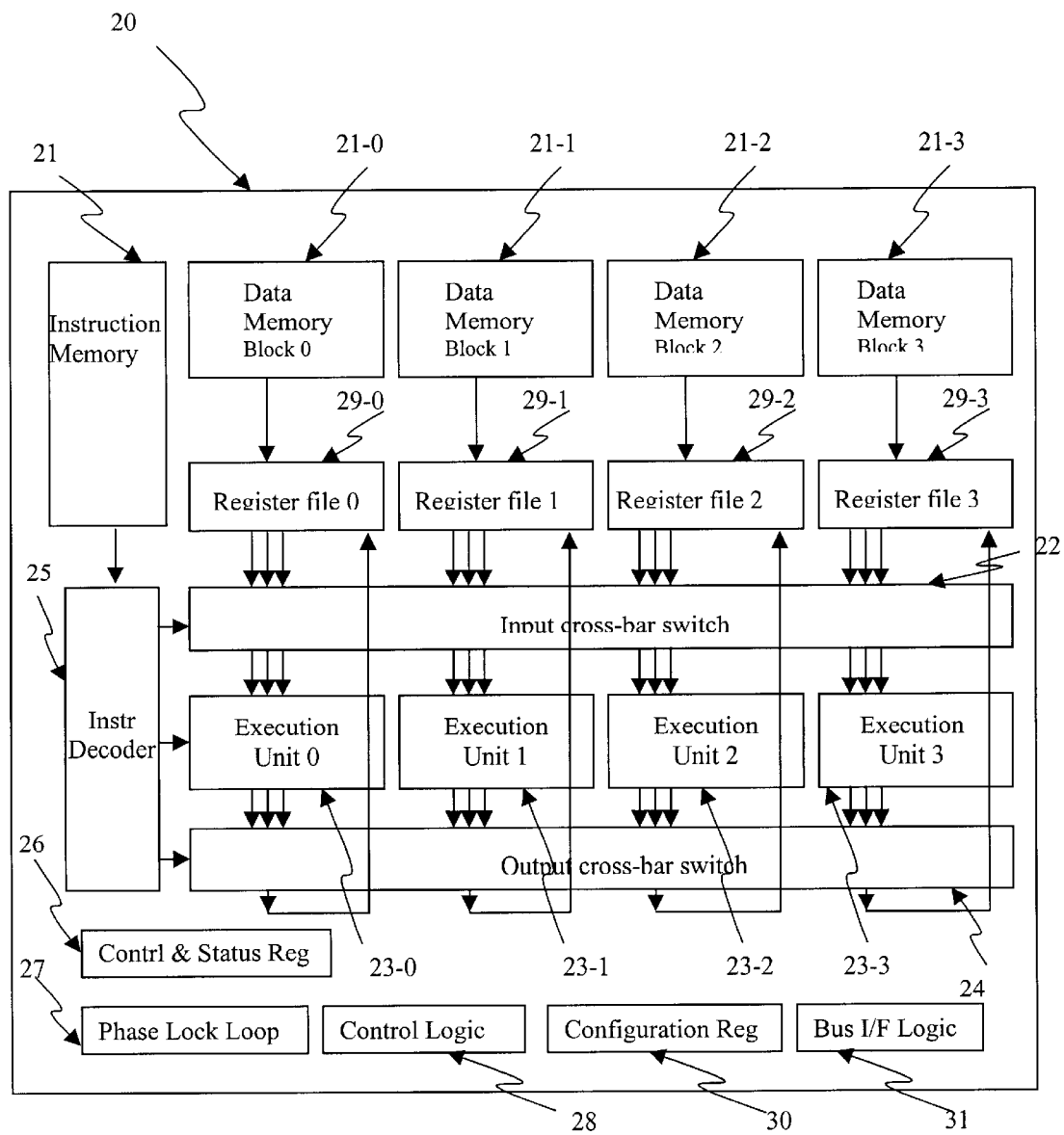
FIG. 8 shows the detailed block diagram of a smart memory integrated circuit.

FIG. 8 shows the detailed block diagram inside each SMIC 20. The SMIC has the instruction memory 21, data memory blocks 21-0 through 21-3, registers 29-0 through 29-3, input cross-bar switch 22, execution units 23-0 through 23-3, output cross-bar switch 24, instruction decoder 25, control and status registers 26, phase-locked loop 27, control logic 28, and configuration registers 30. The data memory blocks, 21-0 through 21-3, contain data for storage as well as for processing. Four data memory blocks are shown in FIG. 8 as an example to illustrate the functionality of the smart memory. For those skilled in the art should understand that the number of memory blocks can be different for different applications without loss the scope of this invention. The data memory blocks have register files 29-0 through 29-3 to store the temporary data as buffers between the high-speed processing units and the low-speed memory. The register files are smaller in size but are faster and have multiple ports to increase the bandwidth. One embodiment is to eliminate the register files and use multiple-port memories instead. But this approach may increase the cost and therefore is not the preferred embodiment. The memory blocks have the execution units, 23-0 through 23-3, to associate with each memory block. The execution units may be, but not limited to, the Arithmetic and Logic Units (ALU), floating-point processors, special function processors, or even a Single Instruction Multiple Data (SIMD) execution unit, etc. The input cross-bar switch 22 allows the execution units processing data from different data memory blocks, and the output cross-bar switch 24 allows storing data into different data memory blocks. The instruction memory 21 stores the instructions to be executed by the execution units through the instruction decoder 25. The control and status registers 26 stores the processor status word, system parameters, and processor control bits. One of the control registers is the mask register to selectively turn on all or some execution units. The phase lock loop 27 allows the SMIC running at a different clock rate than the memory I/O speed. The control logic 28 has the control over how the SMIC executing instructions, processing exceptions, generating control and status bits, etc. The configuration registers 30 determines the partition of instruction and data spaces within SMICs, the number of the data memory blocks associated with each execution units, the clock rate multiple, and others. The configuration registers have a capability to disable some execution units to allow more data memory for each execution unit in a further optimization. The bus interface logic 31 is responsible for requesting bus ownership, accepting triggering or interrupt signal, synchronizing with other SMICs, or producing interrupt signal.

When a smart memory computing system is about to run a program, the data in the SMICs are initialized when the executable code is loaded into the memory. Then the CPU configures the smart memory system by sending data to the configuration registers 30 to determine the instruction/data memory partition, clock rate multiple, etc. The content of the instruction memory 21 and the system utilities to process the interrupts and exceptions are also loaded into 21. Alternatively, the instruction 21, data 21-0 through 21-3, control and status registers 26, and configuration registers 30 can be updated during run time. Note that all the memory blocks and registers, including data, instruction, control and status registers, configuration registers are mapped into the overall smart memory addressable space and can be accessed by CPU through a memory instruction.

When the program in execution encounters a section with massive data-level parallelism, the CPU triggers the smart memory execution. The triggering mechanism can be either CPU asserting a signal or CPU writing certain data into a specific memory location that is mapped into the control and status registers, for example. The data written can be very specific such that each SMIC can be triggered individually by the CPU. Once the smart memory system execution is triggered, all the execution units in SMICs are running in parallel.

The executing in the smart memory system is very similar to a conventional CPU except that the number of processing units are huge and are executing in parallel. The data are fetched from the data memory blocks 21-0 through 21-3 and stored in the registers 29-0 through 29-3 to be fed into the execution units 23-0 through 23-3. During the execution, the SMIC can also access data from the other SMICs or main memory through the common bus. Once the smart memory execution is triggered, the data bus can be requested to use by the SMICs to pass data among themselves. If the SMICs do not need the memory bus, the CPU can use this bus to continue program execution as long as there is no dependency. The instruction execution can be pipelined to increase the processing efficiency. The clock rate in the execution units can be several times higher than the memory I/O rate to maximize the on-chip execution. The Phase-Locked Loop (PLL) is a circuit block to generate a higher clock rate for execution units from a low clock rate in the memory I/O interface.

Some floating-point processing may have exceptions such as denormalization, overflow, or underflow. The exception can be fixed by hardware or by software executing a software routine in the instruction memory. Either way, the execution cycles for that processing unit will be stretched comparing with the other smart memory execution units. Since the data communication among the SMICs is needed and may be frequent, the out of synchronization between the smart memory execution units is very undesirable. One embodiment to solve the synchronization problem is to stall the other execution units when one execution unit has exceptions. The synchronization among the same SMIC can be easily solved in the same cycle by issuing a stall signal. But the synchronization between different SMICs may be one or a few cycles late. This may not cause any serious problems as long as the stall cycles are fixed. The easier solution for synchronization is to issue the stall nullification signal a few cycles earlier to compensate the fix-cycle delay between two different SMICs. The instruction memory space has a partition to store routines for processing the exceptions and interrupts, called exception handlers, just like a conventional CPU.

When all the execution units in one SMIC finish executing, the SMIC will set a flag in the status register or issue a READY signal. The smart memory system can OR the flags or the READY signals of all the SMICs for CPU to poll, or to interrupt the CPU to inform the end-of-execution.

Figure 9:
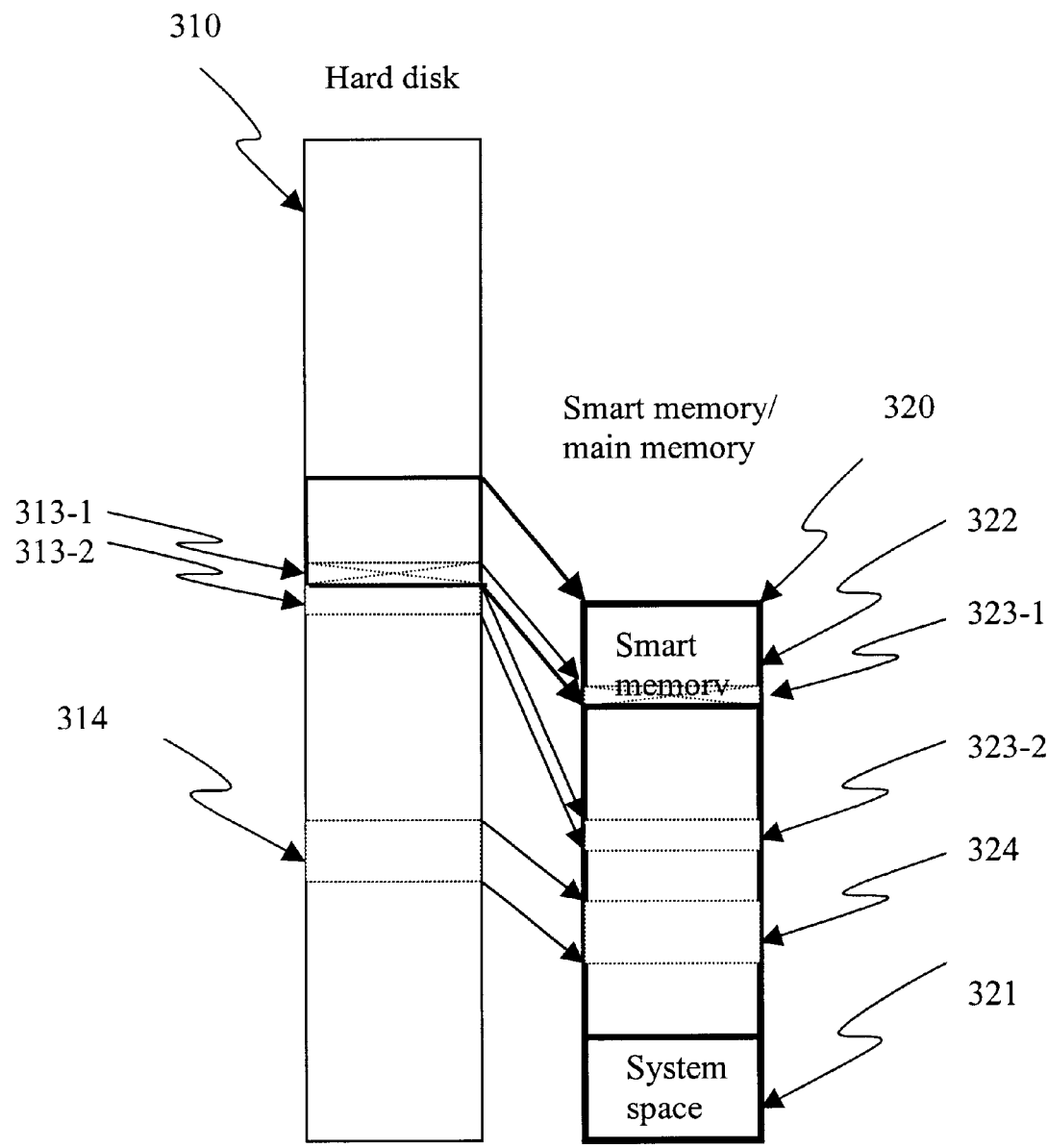
FIG. 9 shows the memory map in a smart memory system from the operating system perspective.

FIG. 9 shows an example of how the smart memory space can be mapped into the overall system memory. Block 310 shows the hard disk memory space, the addressable memory space by a host processor (e.g., CPU 10). Block 320 shows the system memory that consists of the main memory and the smart memory space. The main memory has the system space and user space as in any conventional computers. The main memory has the virtual memory mapping to map the memory block 313-2 into main memory 323-2 and/or map the memory block 314 into the memory block 324. However, the smart memory occupies a fixed physical memory space addressable by CPU that is not subjected to the virtual memory mapping. If the chunk of data 313-1 in the hard disk has massive data-level parallelism, this chunk of data can be moved into the smart memory space 323-1 and then processed there. By not using the virtual memory mapping, the compiler can have direct control over how to map the data from the user space on the hard disk (or any nonvolatile massive data storage device) into the smart memory.

FIGS. 10(a)–10(e) show five communication mechanisms between the smart memory and the host CPU. The communication mechanisms are: triggering, notification, bus initiation, interrupt receiving, and synchronization.

Figure 10A:
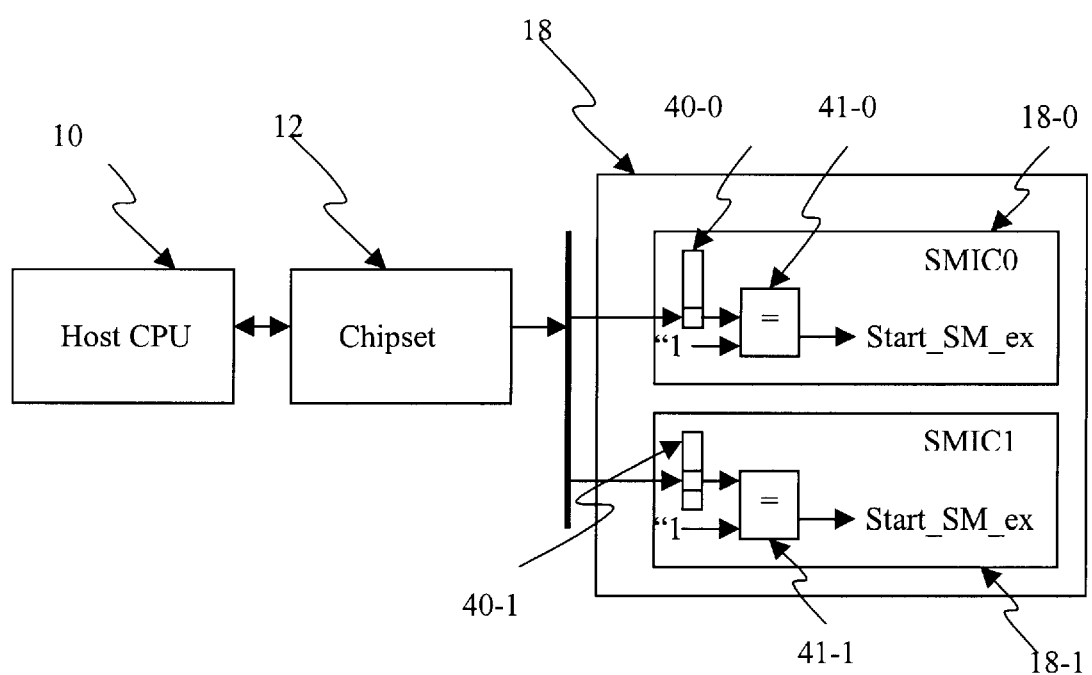
FIG. 10(a) shows the communication mechanism between smart memory and the host in triggering smart memory execution.

FIG. 10(a) shows how the host CPU can trigger the smart memory execution according to one embodiment of the invention. When the CPU 10, through a chipset 12, writes into a special memory location 40-0 and 40-1 for SMICs 18-0 and 18-1, respectively, the content in the special memory locations are fed to the comparators 41-0 and 41-1, respectively. If a "1" is detected by the comparators 41-0 and 41-1, the smart memory execution in the corresponding SMIC is triggered. Note that each SMIC can be triggered individually or all together. In one embodiment, the special memory location can be implemented as a register outside of the memory array. Another embodiment is to send a special signal for triggering.

Figure 10B:
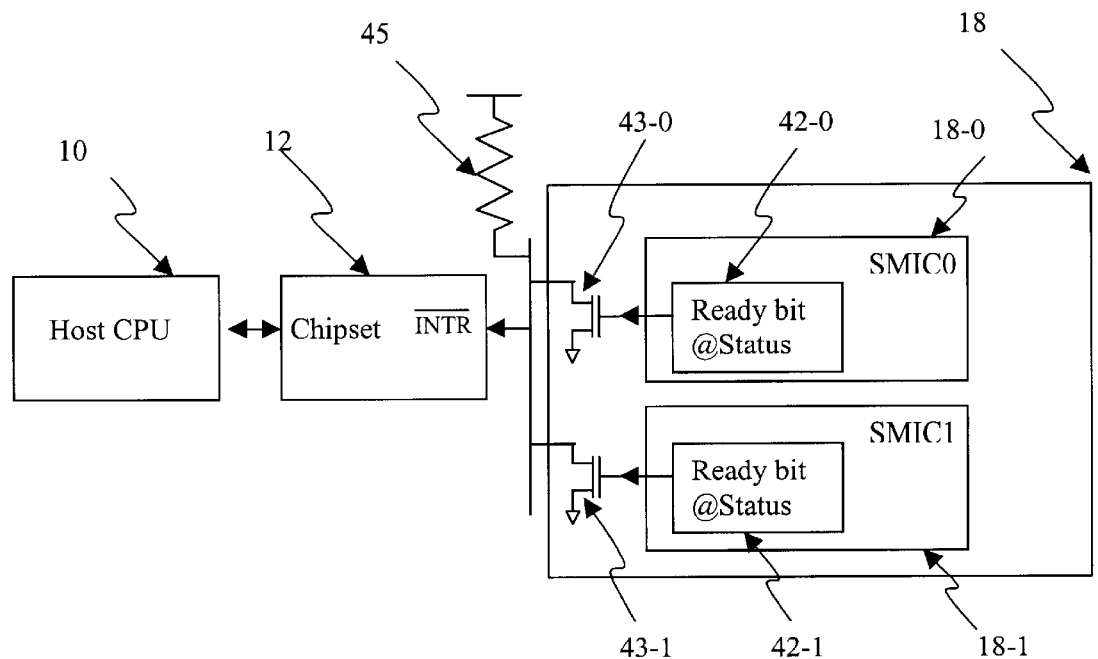
FIG. 10(b) shows the communication mechanism between smart memory and the host in notifying end of smart memory execution.

FIG. 10(b) shows an end of execution notification according to one embodiment of the invention. When all of the SMICs finish execution, a READY bit will be set in each status register 42-0 and 42-1 for SMIC0 and SMIC1, respectively. These READY bits are OR'ed by OR circuit 45 to interrupt the CPU 10 indicating that the smart memory execution is complete and waiting for further instructions. In another embodiment, the CPU 10 can detect the end of execution by polling the READY bits in the SMICs.

Figure 10C:
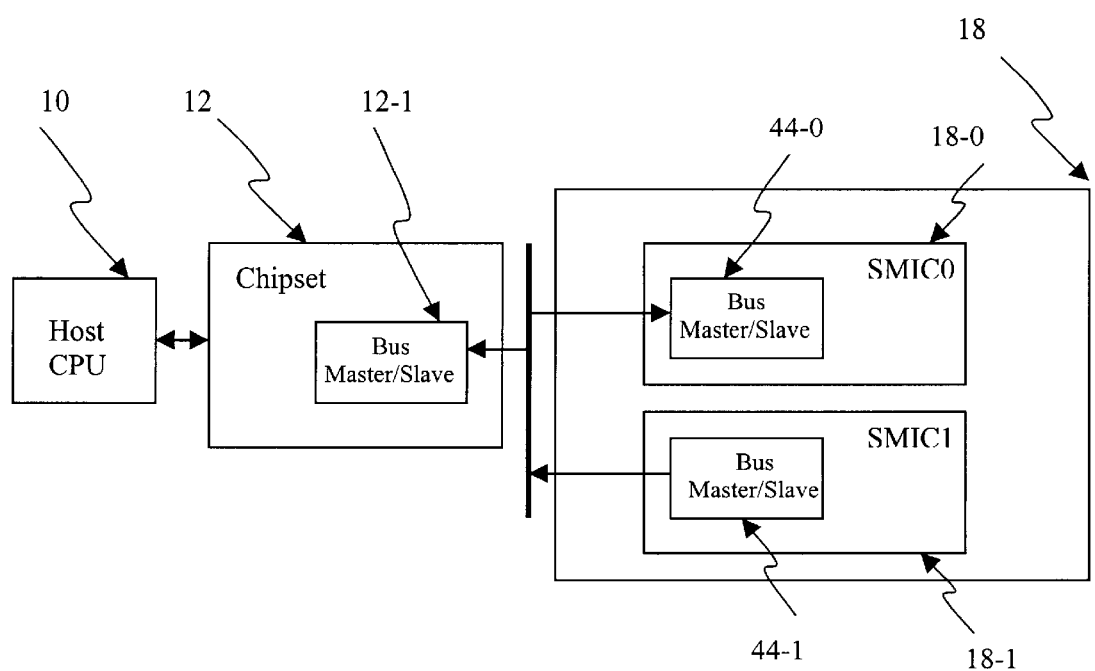
FIG. 10(c) shows the communication mechanism between smart memory and the host in smart memory initiating bus transaction.

FIG. 10(c) shows bus master capability of the SMICs according to one embodiment of the invention. When SMIC1 needs to send data to SMIC0, the bus master capability of bus unit 44-1 in SMIC1 initiates a bus request. When the chipset 12 and the SMIC0 18-0 detect this bus request in bus units 12-1 and 44-0, respectively, the chipset 12 backs off this bus and the SMIC0 18-0 acts as bus slaves. In one embodiment, the bus can be a simple 4-wire Serial Peripheral Interface (SPI) type of interface for bus request and grant, while the actual data transfer can still be in the high bandwidth memory bus.

Figure 10D:
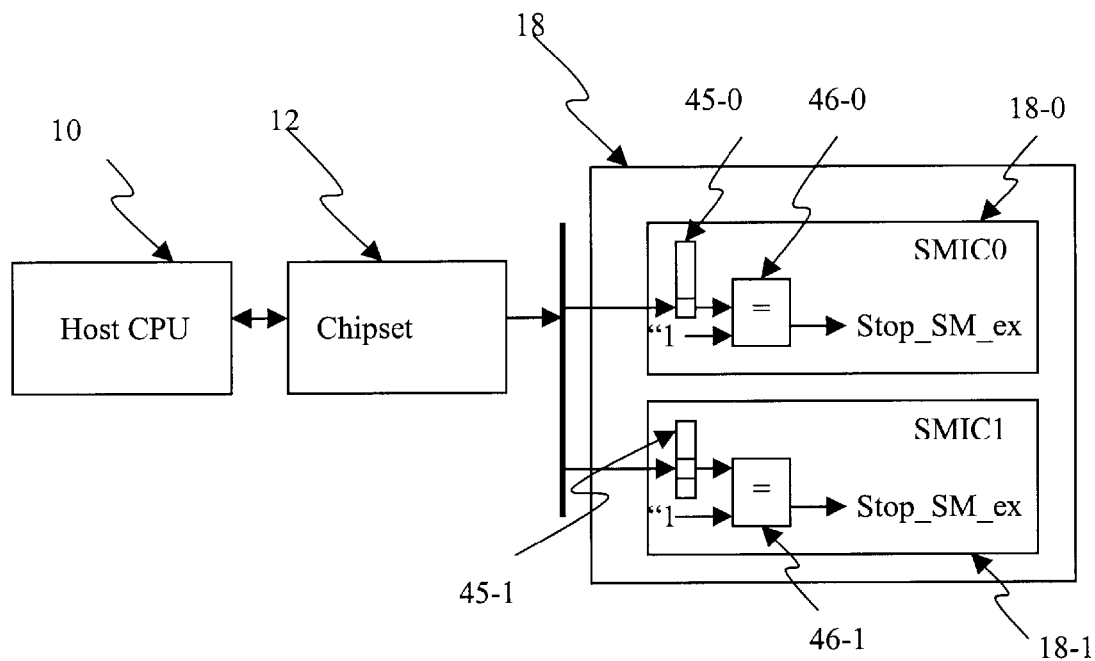
FIG. 10(d) shows the communication mechanism between smart memory and the host in receiving interrupts from the host.

FIG. 10(d) shows how the smart memory can accept an interrupt from the host CPU to terminate execution according to one embodiment of the invention. When the CPU detects smart memory running for a long time and decides to terminate its execution, the CPU writes into a special memory location 45-0 and 45-1 for SMIC0 and SMIC1, respectively. If a "1" is detected by comparators 46-0 and 461, a Stop__SM__ex signal can be generated to terminate execution by the corresponding smart memory. In an alternative embodiment, the CPU can send a special signal to SMIC0 and SMIC1 for termination.

Figure 10E:
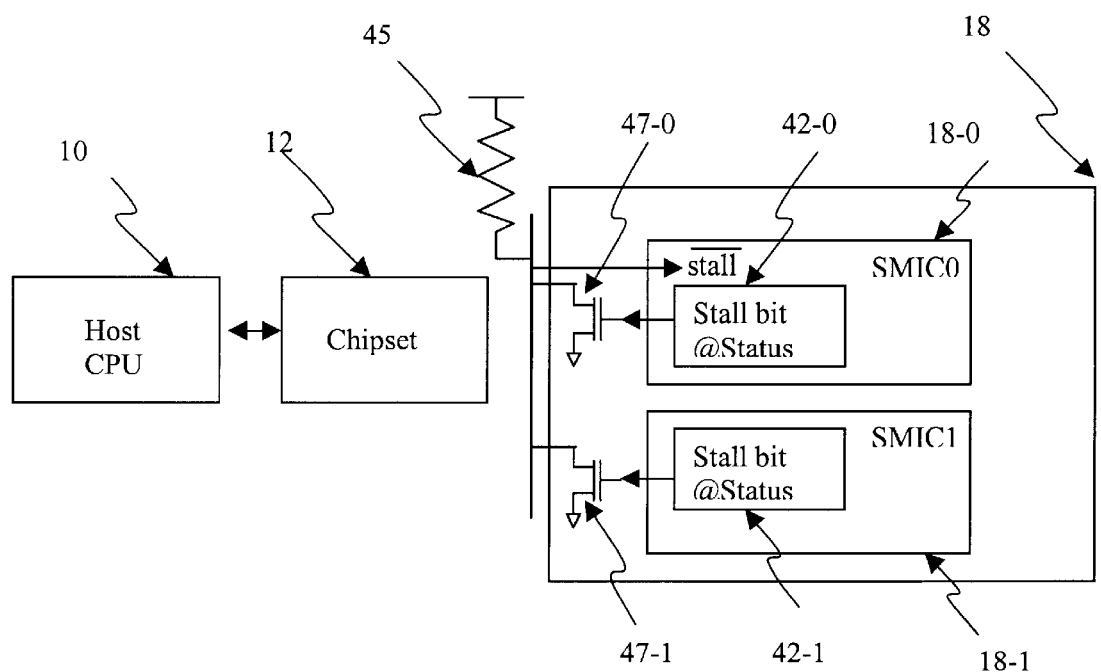
FIG. 10(e) shows the communication mechanism between smart memory and the host in synchronizing the smart memory execution among the different smart memory integrated circuits.

FIG. 10(e) shows how the smart memory synchronizes execution among different SMICs according to one embodiment of the invention. If the SMIC1 would like to stall the other SMICs for synchronization, a stall bit at the status register 42-1 can be asserted to pull down a device 47-1 in a wired-NOR circuit 45. When the other SMICs detect a "0" in the output of the wired-NOR circuit 45, the execution in the other SMICs is stalled. Those skilled in the art should appreciate that the stall mechanism is not constrained to the wide-NOR circuit 45 as various other implementations are available.

The invention of the smart memory computing system utilized a memory system having processing capabilities in additional to data storage. Therefore, the SMICs behave like a multiple-functional unit CPU with integrated memory. Moreover, the smart memory sub-system also has the bus master capabilities to interrupt CPU and to request bus ownership. The general computing concepts such as type and number of execution units, instruction decoder, register files, scratch pad RAM, data memories, pipeline, status and control registers, exception and interrupt can be applied to the smart memory computing system without loss the scope of this invention.

The invention is preferably implemented electronic circuitry, but can be implemented by electronic circuitry in combination with software. Such software can be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices, and carrier waves. The computer readable medium can also be distributed over network-coupled computer systems so that the computer readable code is stored and executed in a distributed fashion.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A smart memory computing system to process data in parallel, said smart memory system comprising:
    a central processing unit;
    a main memory unit that provides data storage for said central processing unit;
    a smart memory unit to not only store data for said central processing unit but also to process data therein;
    a massive data storage that provides storage for a superset of data stored in said main memory system and in said smart memory system; and a trigger mechanism for said central processing unit to initiate processing of a processing batch by said smart memory unit.

2. A smart memory computing system as recited in claim 1, wherein said smart memory unit operates as a coprocessor for said central processing unit.

3. A smart memory computing system as recited in claim 1, wherein said smart memory computing system further comprises:
a chip set to facilitate said central processing unit in accessing said main memory unit and said smart memory unit therethrough.

4. A smart memory computing system as recited in claim 1, wherein said central processing unit can comprises at least one of an Arithmetic and Logic Unit (ALU), a floating-point processor, a single-instruction-multiple-data execution unit, and a special function processor.

5. A smart memory computing system as recited in claim 1, wherein said smart memory computing system further comprises:
A set of mechanisms for said central processing unit to interact with said smart memory unit.

6. A smart memory computing system as recited in claim 1, wherein said smart memory computing system further comprising:
a notification mechanism for said smart memory unit to notify said central processing unit of completion of the processing batch.

7. A smart memory computing system as recited in claim 1, wherein said smart memory computing system further comprising:
an interrupt controller within or coupled to said smart memory unit, said interrupt controller for interrupting the processing batch by said smart memory unit.

8. A smart memory computing system as recited in claim 7, wherein said smart memory computing system further comprising:
a notification mechanism for said smart memory unit to notify said central processing unit of completion of a processing batch.

9. A smart memory computing system as recited in claim 7, wherein said smart memory computing system further comprising:
a bus operatively connecting said smart memory unit to at least one of said main memory unit and said central processing unit.

10. A smart memory computing system as recited in claim 9, wherein said smart memory unit comprises a first port coupled to said bus and a second port for coupled to an external device.

11. A smart memory computing system as recited in claim 9, wherein said bus is one of a memory bus, an I/O bus or a graphics bus.

12. A smart memory computing system as recited in claim 1, wherein said smart memory unit comprises a first smart memory integrated circuit and a second smart memory integrated circuit.

13. A smart memory computing system as recited in claim 1, wherein said smart memory unit comprises at least one smart memory integrated circuit.

14. A smart memory computing system as recited in claim 13, wherein said smart memory integrated circuit comprises:
an instruction memory;
a plurality of data memory blocks that store data for general storage or buffering as well as for processing;
an input cross-bar switch coupled to said data memory blocks;
a plurality of execution units coupled to said input cross-bar switch and thus to said data memory blocks, said execution units execute instructions stored in said instruction memory;
an output cross-bar switch coupled to said execution units;
a plurality of control and status registers;
control logic;
a plurality of configuration registers; and
bus interface logic.

15. A smart memory computing system as recited in claim 14, wherein said bus interface logic is responsible for requesting bus ownership, accepting triggering or interrupt signals, synchronizing within smart memory system, or producing interrupt signal.

16. A smart memory computing system to process data in parallel, said smart memory system comprising:
a central processing unit;
a main memory unit that provides data storage for said central processing unit;
a smart memory unit to not only store data for said central processing unit but also to process data therein;
a massive data storage that provides storage for a superset of data stored in said main memory system and in said smart memory system; and
a stall mechanism for stalling execution by at least part of said smart memory unit.

17. A smart memory computing system as recited in claim 16, wherein the part of said smart memory system activates said stall mechanism.

18. A smart memory computing system to process data in parallel, said smart memory system comprising:
a central processing unit;
a main memory unit that provides data storage for said central processing unit;
a smart memory unit to not only store data for said central processing unit but also to process data therein, wherein said smart memory unit comprises a first smart memory integrated circuit and a second smart memory integrated circuit;
a massive data storage that provide storage for a superset of data stored in said main memory system and in said smart memory system; and
a bus operatively connecting said first and second smart memory integrated circuits to at least one of said main memory unit and said central processing unit.

19. A smart memory computing system as recited in claim 18, wherein said smart memory computing system further comprising:
an interrupt controller within or coupled to said smart memory unit, said interrupt controller for interrupting a processing batch by said smart memory unit.

20. A smart memory computing system as recited in claim 18, wherein said first and second smart memory integrated circuits are able to request usage of said bus for data transfer.

21. A smart memory computing system as recited in claim 20, wherein data can be passed between said first and second smart memory integrated circuits over said bus.

22. A smart memory computing system to process data in parallel, said smart memory system comprising:
a central processing unit;
a main memory unit that provides data storage for said central processing unit;
a smart memory unit to not only store data for said central processing unit but also to process data therein;

a massive data storage that provides storage for a superset of data stored in said main memory system and in said smart memory system;

means for said central processing unit to interact with said smart memory system; and a trigger mechanism for said central processing unit to initiate processing of a processing batch by said smart memory unit.

* * * * *